United States Patent [19]

Watanabe et al.

[11] 3,945,017
[45] Mar. 16, 1976

[54] AUTOMATIC THERMOGRAPH

[75] Inventors: Satoshi Watanabe; Koji Sato, both of Tokorozawa, Japan

[73] Assignee: Kabushiki Kaisha Saginomiya Seisakusho, Tokyo, Japan

[22] Filed: Feb. 7, 1975

[21] Appl. No.: 548,059

[30] Foreign Application Priority Data
Feb. 9, 1974  Japan................................ 49-16004

[52] U.S. Cl............ 346/33 TP; 346/72; 346/139 R; 73/343.5; 73/363
[51] Int. Cl.² G01D 9/00; G01D 15/16; G01K 5/70; G01K 5/02
[58] Field of Search............... 346/33 TP, 72, 139 R; 73/343.5, 391

[56] References Cited
UNITED STATES PATENTS

| | | | |
|---|---|---|---|
| 772,035 | 10/1904 | Fulton | 73/343.5 |
| 3,119,269 | 1/1964 | Hiscock | 346/33 TP |
| 3,487,691 | 1/1970 | Johnson | 346/72 X |

FOREIGN PATENTS OR APPLICATIONS
840,769  4/1952  Germany.......................... 346/33 TP

*Primary Examiner*—George H. Miller, Jr.
*Attorney, Agent, or Firm*—Woodhams, Blanchard and Flynn

[57] ABSTRACT

An automatic thermograph comprising a means for sensing a variation of temperature by use of a gas and a gas absorbing substance container therein; a recording section including a means for coverting said variation of temperature into a variation of pressure, a means for counteracting said converting means for actuating a lever according to the variation of pressure to turn a nib fixed on an extension of said lever and record the variation of temperature; and a cartridge containing therein a chart paper and removably attached to the recording section. With this invention, collecting data for controlling temperature in a cooled show-case or in a reservoir of perishable foods, blood or vaccines can be done with a thermograph which is low-priced, small-sized and easy to handle.

2 Claims, 3 Drawing Figures

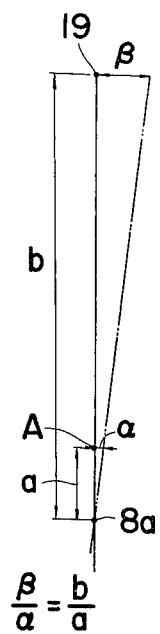
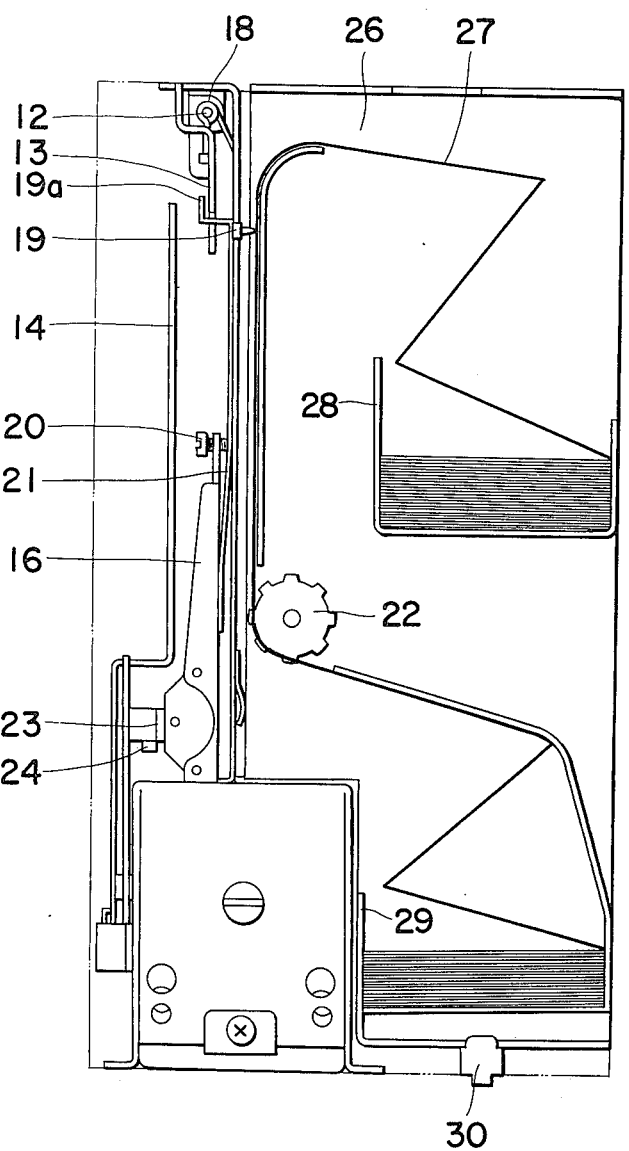

AUTOMATIC THERMOGRAPH

The present invention relates to an automatic thermograph for providing data for controlling temperature in a cooled show-case or a reservoir of perishable food, blood, vaccines, etc.

There are widely used devices for indicating a temperature in such places. However, the devices of this kind are not suited for collecting data required for temperature control. For this purpose, an electronic thermograph has been proposed but since it is high-priced, large-sized and not easy to handle, it is rarely employed. Therefore, there have heretofore been employed conventional thermometers, leading to a poor control of temperature.

The present invention is intended to overcome the above difficulties and it is therefore an object of the present invention to provide an automatic thermograph which is low-priced, small-sized and easy to handle.

It is another object of the present invention to provide an automatic thermograph which provides accurate data for temperature control over a wide range by charging, in a sensing means, a gas and a gas absorbing substance which has a specific gas absorption capacity varying in accordance with a variation of temperature.

It is a further object of the present invention to provide an automatic thermograph wherein the range of temperature to be controlled can be easily changed by a simple mechanical regulation.

Essentially, according to the present invention, there is provided an automatic thermograph comprising a means for sensing a variation of temperature which contains a gas and a gas absorbing substance; a recording section including a converting means for converting said variation of temperature into a variation of pressure, a means for counteracting, with a predetermined pressure, said converting means and an actuating means for actuating a lever according to the variation of pressure to turn a nib attached to an extension of said lever and to record, on a sheet of chart paper continuously fed, the variation of temperature, said actuating means comprising a first means displaceable according to the variation of pressure and a second means for converting the displacement of said first means to a pivotal movement of said lever and regulating a magnitude of the pivotal movements of said lever; and a cartridge having said sheet of chart paper contained therein and being removably attached to the recording section.

The present invention will now be described in more detail with reference to the accompanying drawings which show a preferred embodiment of the present invention, in which:

FIG. 2 is a diagrammatic side view of the automatic thermograph shown in FIG. 1;

FIG. 3 is a diagrammatic view illustrating how the magnitude of the movement of a nib is adjusted.

Figure 1:
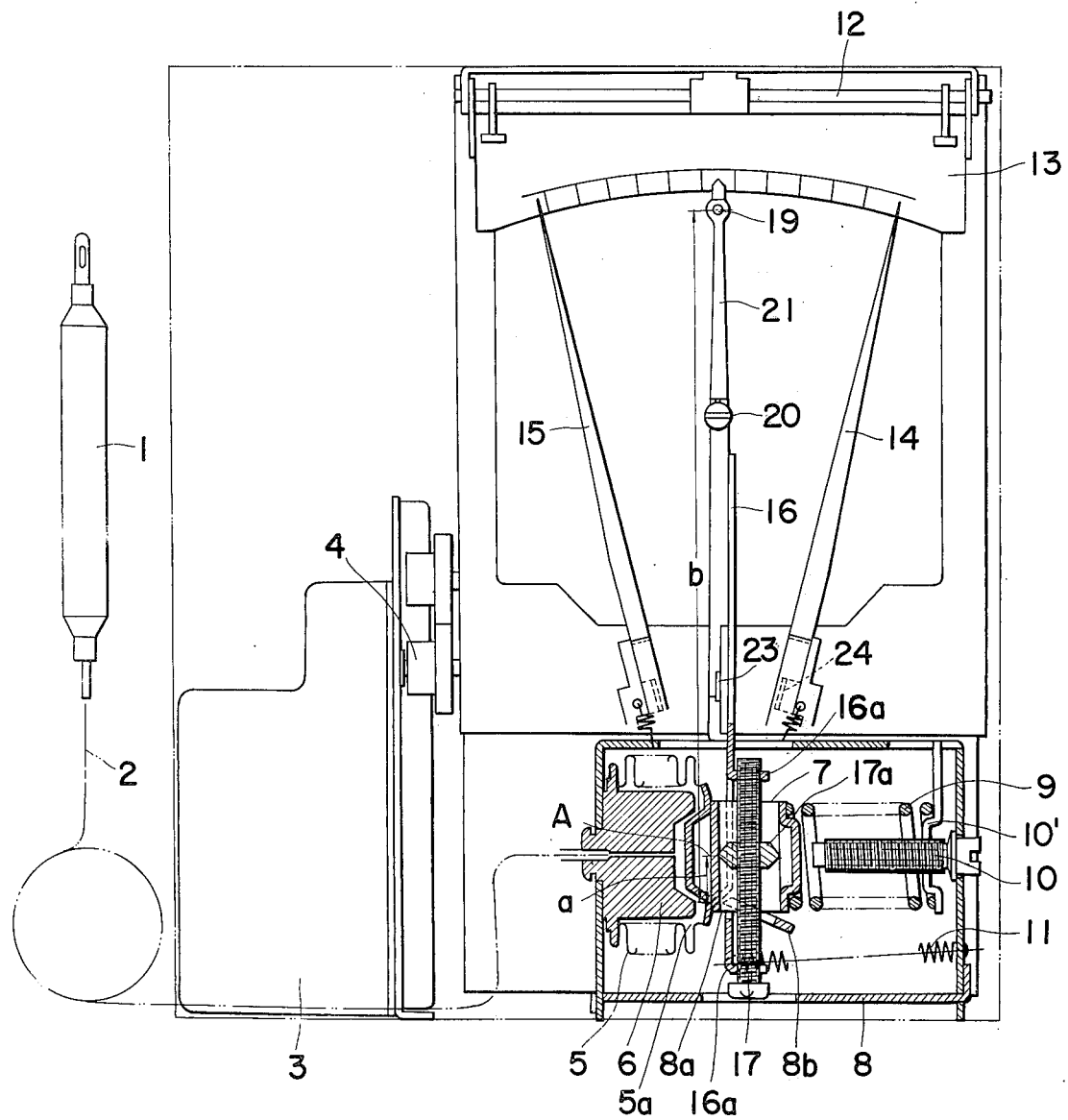
FIG. 1 is a partly sectional front view of an automatic thermograph embodying the present invention.

Referring now to FIG. 1, there is shown one preferred embodiment of the present invention wherein numeral 1 designates a means for sensing a variation of temperature in a cooled show-case or a reservoir of perishable foods, blood, vaccines, etc. Said sensing means is charged with a gas such as monochlorodifluoromethane and a gas absorbing substance such as activated charcoal which shows a large and proportionate variation in the gas absorbing capacity. Said sensing means communicates to a means for converting a variation of temperature into a variation of pressure. Illustratively stated, the gas is led from said sensing means through a pipe 2 and a bore penetrating a diaphragm seat 6 fixed to an inner wall of a casing 8 to the inside of a hermetical chamber 5a of a bellows type diaphragm 5. The lip of said bellows type diaphragm 5 is hermetically fitted to the diaphragm seat 6. On the forward end of the diaphragm 5 there is fixed a disc of rigid material which is allowed to move to and fro in accordance with a variation of a gas pressure inside hermetical chamber 5a of the diaphragm 5. In an opposing relation to said bellows type diaphragm 5, there is provided a compression spring 9 which is engaged at its first end with an adjusting screw 10 screwed into the casing 8. Between the diaphragm 5 and the compression spring 9 there is movably disposed a channel-shaped drive plate 7. Said channel-shaped drive plate 7 has a first wing portion, a second wing portion and a central portion. Said first wing portion and said second wing portion are formed in a confronting relation and integrally through said central portion. Said first wing portion is flat while said second wing portion is convex for engaging a second end of the compression spring 9. Said first wing portion abuts against said bellows type diaphragm 5 and said second wing portion is engaged with the second end of said compression spring. With this structure, the channel-shaped drive plate 7 is supported by the force of the compression spring 9 and the pressure from the bellows type diaphragm 5.

Said adjusting screw 10 is screwed also into a disc 10'. An end of an extension from said disc is engaged with a slit formed, in parallel with said adjusting screw 10, on the ceiling of the casing 8. The adjusting screw 10 cooperates with the disc 10' to constitute an adjusting means for adjusting the force caused by the compression spring 9.

Between the first and second wings of the channel-shaped drive plate 7, there is provided an adjusting pole 17 having at its intermediate portion a die 17a fixedly attached thereto. A tip portion of said die 17a contacts, at a point A, the inner wall of the first wing portion contacting the rigid disc of the bellow-type diaphragm 5. On the back side of the central portion of the channel-shaped drive plate 7, there is provided a lever 16. From an intermediate portion of said lever 16, there is extending a first bracket 16a into which a top end portion of the pole 17 is screwed. From the bottom end portion of said lever 16, there is extending a second bracket 16a into which the bottom end portion of the pole 17 is screwed. Said lever 16 is pivotally supported, being spaced from the drive plate 7, on a fulcrum 8a by the free end of a fulcrum plate 8b which is fixedly connected at its other end to the casing 8. Said fulcrum 8a lies on an extension of a line connecting the point A at which the die 17a contacts the inner wall of the first wing portion and a nib 19 which will be explained later. There is also provided a tension spring 11 which is fixedly attached at its one end to the casing 8 and at its other end to the bottom end portion of said adjusting pole 17. To the other end of the leaf spring 21 is fixed the nib 19 and a force which the nib 19 exerts on a sheet of chart paper is adjusted by a screw attached to the lever 16. On the right of the lever 16 and the leaf spring 21 fixed thereon, there is provided an alarm plate 14 for checking the highest limit in the allowable temperature range. On the left of the lever 16 and the leaf spring 21 fixed thereon, there is provided an alarm plate 15 for checking the lowest limit in the allowable temperature range. On each of the alarm plates 14 and 15, there is provided a contact 24, which is adapted to contact a contact 23 attached to the lever 16.

As easily understood from the foregoing, the bellows-type diaphragm 5, the diaphragm seat 6, the channel-shaped drive plate 7, the casing 8, the fulcrum plate 8b, the compression spring 9, the adjusting screw 10, the disc 10', the tension spring 11, the alarm plates 14 and 15, the lever 16, the adjusting pole 17, the nib 19, the screw 20, the leaf spring 21 and the contacts 23 and 24 constitute a recording section.

Among the above members, the bellows-type diaphragm 5 and the diaphragm seat 6 constitute a means for converting the variation of temperature sensed by the sensing means 1 into a variation of pressure; the compression spring 9 and the tension spring 11 constitute a means for counteracting, with predetermined pressure, said converting means, the channel-shaped drive plate 7 and the adjusting pole 17 cooperates to function as an actuating means for actuating the lever 16.

Referring to FIG. 2, there is attached a pointer 19a to the top portion of the leaf spring 21. The pointer 19a is engaged with a scale plate 13 as depicted. There is provided a shaft 12 behind a protrusion jutting from a top portion of the scale plate 13 at its middle portion. On the intermediate portion of the shaft 12, there is a projection extending therefrom and adapted to press the scale plate 13 from behind. On the front side of the scale plate 13, there are provided knobs 18 fixedly attached to both end portions of the shaft 12. A cartridge 26 is removably attached to the recording section by a locking means 30. In the cartridge 26, a chart paper 27 is fed from a box 28 to a box 29 by a sprocket 22 driven by a motor 3 shown in FIG. 1 through a clutch 4 shown in FIG. 1.

Referring to FIG. 3, $\alpha$ represents the distance by which the point A displaces and $\beta$ represents the distance by which the nib 19 travels. Character a represents the distance from the fulcrum 8a to the point A. Character b represents the distance from the fulcrum 8a to the nib 19. It is clearly seen that the distance $\beta$ by which the nib 19 travels is adjusted by changing the position of A.

In operation, a gas absorbing capacity of the gas absorbing substance such as activated charcoal charged together with a gas such as monochlorodifluoromethane in the sensing means 1 varies in accordance with a variation of temperature. If the temperature around the sensing means 1 rises, the gas pressure inside the hermetical chamber 5a of the bellows type diaphragm 5 increases. When the total of the force of the compression spring 9 and the force of the tension spring 11 is in equilibrium with the force of the bellows type diaphragm 5 exerted by the gas pressure inside, the pointer 19a is positioned in the middle of the scale. However if it surpasses the total of the forces of the spring 9 and 11, the channel-shaped drive plate 7 is pressed by the action of the bellows type diaphragm 5 so that the point A at which the die 17a contacts the first wing portion of the drive plate 7 displaces by a distance of $\alpha$ in the direction toward the compression spring 9. Therefore, the lever 16 pivots in the clockwise direction about the fulcrum 8a while the adjusting pole 17 pivots in the same direction about the point A, thus displacing the nib 19 from the center of the scale plate 13 by a distance of $\beta$ as shown in FIG. 3. Meanwhile, when the total of the force of the compression spring 9 and the force of the tension spring 11 is larger than the force of the bellows type diaphragm 5 exerted by the gas pressure, the drive plate 7 is pressed toward the diaphragm 5 by the force of the spring 9, while the pole 17 which pivots, under the influence of the force of the spring 11, about the contact point A in the counterclockwise direction presses the drive plate 7 toward the diaphragm. At the same time, the lever 16 pivots in the counterclockwise direction about the fulcrum 8a. Since the total of the forces of the compression spring 9 and the tension spring 11 is constant, the extent of displacement of the nib 19 is decided by the extent of variation of the gas pressure inside the hermetical chamber 5a.

Since into the two brackets 16a extending from the intermediate portion of the lever 16 and the end portion of the lever 16 are respectively screwed the top and bottom end portions of the pole 17, it is possible to move the pole 17 up and down by giving it axial rotations. As a result, the die 17a fixedly attached to the pole 17 correspondingly moves up and down, thus changing the distance a from the fulcrum 8a to the point A at which the die 17a contacts the inner wall of the first wing portion of the channel-shaped drive plate 7. In this way, it is possible to change the distance $\alpha$. More specifically, since the distance b from the fulcrum 8 a to the nib 19 is constant, the extent of displacement of the nib 19 is decided by the distance a from the fulcrum 8a to the point A as shown in FIG. 3. Expressed as a formula this relation is $(\beta/\alpha) = b/a$.

When any one of the knobs 18 fixedly attached to both end portions of the shaft 12 is manually pulled, the projection extending from the intermediate portion of the shaft 12 behind the scale plate 13 pivots to press the scale plate from behind. As the scale plate 13 engaged, as depicted in FIG. 2, with the pointer 19a is fixedly connected to the top portion of the leaf spring 21, the nib 19 is caused to be out of contact with the chart paper 27.

The chart paper is set in the cartridge so as to be fed out of the box 28 and fed into the box 29 by means of a sprocket 22, during shich it comes into contact with the nib 19. After the use, the cartridge 26 is detached from the recording section, and replaced by a new one.

As described, according to the present invention, there is provided an automatic thermograph capable of accurately, continuously recording the variation of temperature which is compact and low-priced as compared with an electronic type thermograph. In addition, since the chart paper is set in the cartridge removably attached to the recording section, work of replacing the chart paper is easy. Therefore, the thermograph according to the present invention is suited for use in such places as a show-case or a reaservoir for perishable foods, blood and vaccines.

Moreover, since the sensing means is charged with a gas e.g. monochlorodifluorodifluoromethane and a gas absorbing substance e.g. activated charcoal, the gas absorbing substance shows a great and proportionate variation in the gas absorbing capacity. If the amounts of the gas and the gas absorbing substance charged therein are selectively changed, it is possible to work out any desired function between a variation of temperature and a variation of pressure. In addition, the recording section can be placed apart from the sensing means and hence, it is not subject to an unfavorable influence of the ambient temperature. Consequently, it is possible to correctly record a correct variation of temperature over a wide range.

Furthermore, the thermograph according to the present invention can be used for an alarm since if the contact 23 fixed to the lever 16 comes into contact with the contacts 24 on the alarm plates 14 and 15. The thermograph gives an alarm. It is also possible to modify the thermograph into a switching means for energizing or deenergizing another apparatus.

What is claimed is:

1. An automatic thermograph comprising a means for sensing a variation of temperature which contains a gas and a gas absorbing substance; a recording section including a converting means for converting said variation of temperature into a variation of pressure, a means for counteracting, with a predetermined pressure, said converting means and an actuating means for actuating a lever according to the variation of pressure to turn a nib attached to an extension of said lever and to record, on a sheet of chart paper continuously fed, the variation of temperature, said actuating means comprising a first means displaceable according to the variation of pressure and a second means for converting the displacement of said first means to a pivotal movement of said lever and regulating a magnitude of the pivotal movement of said lever; and a cartridge having said sheet chart paper contained therein and being removably attached to the recording section.

2. An automatic thermograph as claimed in claim 1 wherein said means for converting the variation of temperature into a variation of pressure comprises a bellows type diaphragm and acts on said first means displaceable according to the variation of pressure, said first means comprising a channel-shaped drive plate composed of a first wing portion and a second wing portion which are formed integrally through a central portion; said second means comprises an adjusting pole having at its intermediate portion a die fixedly attached thereto and displaceably attached at its both ends respectively to brackets extending from said lever, said lever being pivotally supported at its portion between said brackets, said die pivotably contacting said first wing portion of the channel-shaped drive plate on its inner wall; and said means for counteracting said converting means comprises a compression spring having a spring force-adjusting means attached thereto, fixedly attached at its one end and abutting at its other end against said second wing portion of the channel-shaped drive plate and a tension spring fixedly attached at its one end and secured at its other end to the lower end portion of said lever or adjusting pole.

* * * * *